United States Patent [19]

York et al.

[11] Patent Number: 5,519,277

[45] Date of Patent: May 21, 1996

[54] ROTOR ASSEMBLY FOR AN ELECTRIC MACHINE

[75] Inventors: Michael T. York, Whitmore Lake; Richard K. Harris, Walled Lake, both of Mich.

[73] Assignee: Ford Motor Company, Dearborn, Mich.

[21] Appl. No.: 363,808

[22] Filed: Dec. 27, 1994

[51] Int. Cl.⁶ ..................................................... H02K 1/22
[52] U.S. Cl. .............................................. 310/263; 310/51
[58] Field of Search ........................... 310/263, 51, 254, 310/43

[56] References Cited

U.S. PATENT DOCUMENTS

| 3,230,404 | 1/1966 | Graham | 310/263 |
|---|---|---|---|
| 3,445,694 | 5/1969 | Campbell et al. | 310/263 |
| 3,591,816 | 7/1971 | Sakamoto et al. | 310/263 |
| 4,228,377 | 10/1980 | Kreuzer | 310/263 |
| 4,611,139 | 9/1986 | Godkin et al. | 310/263 |
| 4,617,485 | 10/1986 | Nakamura et al. | 310/263 |

FOREIGN PATENT DOCUMENTS

| 639082 | 12/1978 | U.S.S.R. |
|---|---|---|
| 653684 | 3/1979 | U.S.S.R. |

*Primary Examiner*—R. Skudy
*Attorney, Agent, or Firm*—Mark S. Sparschu; Roger L. May

[57] ABSTRACT

A rotor assembly for an electrical machine includes two pole pieces with intermeshing pole fingers. Disposed between the pole pieces is a silencer assembly with silencer portions at least partially filling the gaps between adjacent pairs of intermeshed pole fingers. The silencer portions have projections which cooperate with lateral surfaces of the pole fingers to limit outward radial movement of the silencer portions.

14 Claims, 2 Drawing Sheets

ROTOR ASSEMBLY FOR AN ELECTRIC MACHINE

BACKGROUND OF THE INVENTION

1. Field of the Invention

The present invention relates to rotor assemblies for electric machines.

2. Description of the Related Art

In the design of alternators, an important concern is the noise generated by the alternator when it operates. One way this concern is addressed in some "claw pole" type alternators is through the insertion of a plastic silencer in the rotor assembly of the alternator. This silencer fills the gaps between the fingers of the pole pieces of the alternator, causing the rotor's outer surface to be relatively smooth. Windage noise generated by the rotor when it rotates is thus reduced.

Such a use of a silencer introduces a concern, however. Rotors in alternators rotate at very high speeds (some in the vicinity of 20,000 revolutions per minute or more). The centrifugal forces developed at such speeds are very substantial and tend to cause radial expansion of the silencer. Such tendency toward radial expansion is compounded by the high underhood temperatures of many motor vehicles. If the radial expansion is not limited, it can cause the silencer to rub against the stator of the alternator. Failure of the alternator can result.

One potential way to prevent such expansion is illustrated in U.S. Pat. No. 4,617,485, issued to Nakamura. This patent discloses in FIGS. 3 and 4 a silencer with portions 3-b which extend under the pole fingers of the pole pieces of the rotors. However, such a configuration can have problems of its own. The configuration in that patent has a large amount of contact area between the plurality of pole fingers of the rotor and the silencer. Such a large contact area can create a significant frictional force to be overcome in pressing the two pole pieces together to assemble the rotor. Further, such a silencer configuration makes getting varnish to the interior of the assembled rotor a difficult proposition. (Varnish is often applied to a rotor to improve its structural integrity.)

Therefore, a silencer assembly which helps reduce rotor noise, does not present significant obstacles to rotor assembly and which facilitates getting varnish to the interior of the rotor will provide advantages over existing designs.

SUMMARY OF THE INVENTION

The present invention provides a rotor for an electrical machine. The rotor comprises first and second pole pieces together defining an axis of rotation. The pole pieces each have pole fingers extending generally parallel to the axis of rotation, the pole fingers having lateral surfaces. The pole fingers of the pole pieces are further intermeshed with one another, each adjacent intermeshed pole fingers further defining a gap therebetween. The rotor further comprises a silencer. The silencer includes silencing portions at least partially filling the gaps between pole fingers. The silencer further comprises projections adapted to cooperate with the lateral surfaces of said pole fingers to limit outward radial movement of the silencing portions away from the axis of rotation of the rotor.

The present invention also provides an alternator comprising a stator and a rotor rotatably mounted within and in opposition to the stator. The rotor further includes first and second pole pieces together defining an axis of rotation, the pole pieces each having pole fingers extending generally parallel to the axis of rotation, the pole fingers further having lateral surfaces. The pole fingers of the pole pieces intermesh with one another, each adjacent intermeshed pole fingers further defining a gap therebetween. Additionally, the rotor comprises a silencer, the silencer comprising silencing portions at least partially filling the gaps between pole fingers. The silencer further comprises projections adapted to cooperate with the lateral surfaces of the pole fingers to limit outward radial movement of the silencing portions away from the axis of rotation of the rotor.

The present invention allows for the use of a silencer assembly which helps reduce rotor noise, yet which does not present significant obstacles to rotor assembly and which facilitates getting varnish to the interior of the rotor. In doing so, the invention provides advantages over existing designs.

DETAILED DESCRIPTION OF THE PREFERRED EMBODIMENT

Figure 1:
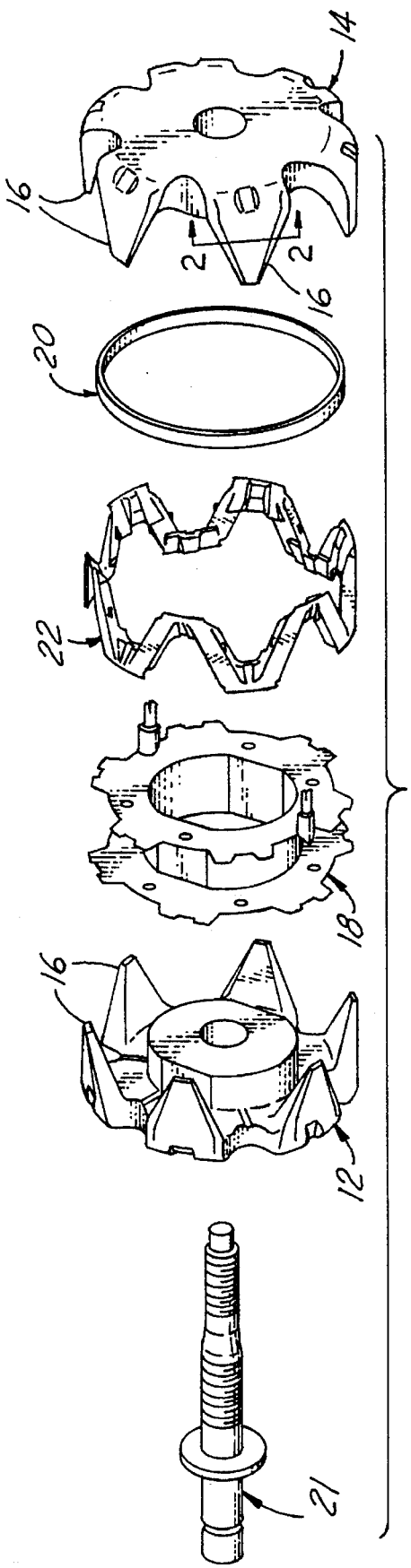
FIG. 1 is an exploded view of a rotor 10 according to one embodiment of the present invention.
Figure 2:
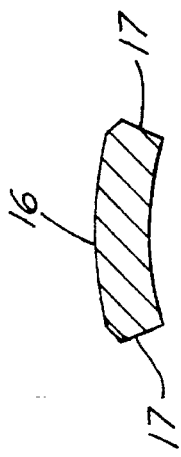
FIG. 2 is a cross-section of a pole finger 16 of rotor 10 of FIG. 1.
Figure 3:
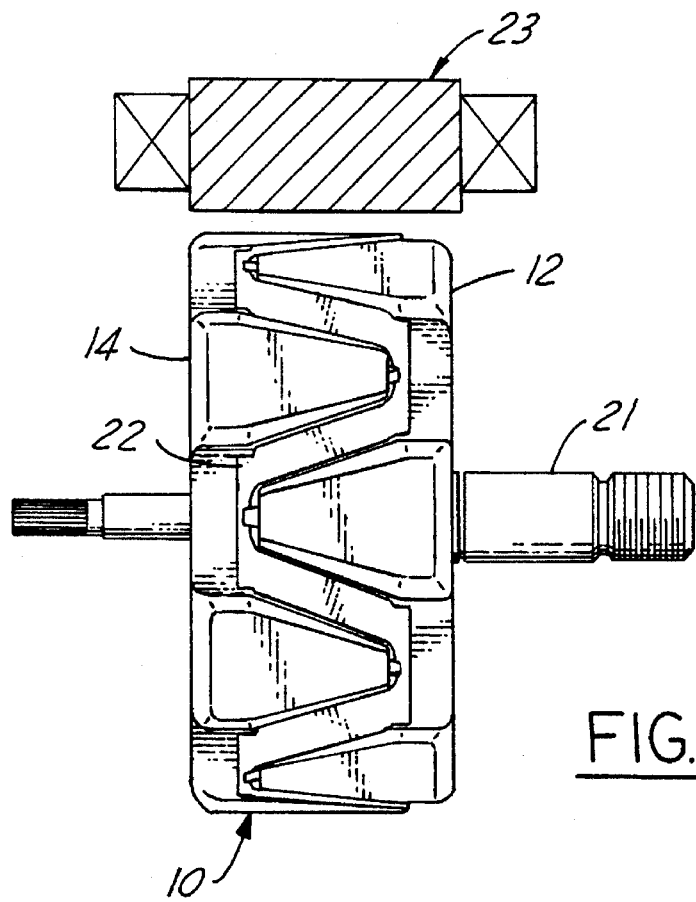
FIG. 3 is a side view of rotor 10 of FIG. 1 in its assembled state, along with a partial cross-sectional view of a stator 23.

Referring to FIGS. 1, 2 and 3, a rotor assembly 10 according to one embodiment of the present invention will be described. Those skilled in the art will recognize rotor assembly 10 as a "claw pole" type rotor. Rotor assembly 10 comprises first pole piece 12 and second pole piece 14. Pole pieces 12 and 14 comprise pole fingers (for example, pole fingers 16). Pole fingers 16 each have two lateral surfaces 17. Disposed between pole pieces 12 and 14 is field coil assembly 18. Further disposed between pole pieces 12 and 14 is noise ring 20. Noise ring 20 is a metallic ring which bears against the interior radius defined by pole fingers 16 of pole pieces 12 and 14. Noise ring 20 helps to reduce noise caused by vibration of pole fingers 16 as rotor assembly 10 rotates.

Also disposed between pole pieces 12 and 14 is silencer 22. Silencer 22 is designed to substantially fill the gaps between pole fingers 16 of pole pieces 12 and 14 when rotor 10 is assembled. Silencer 22 is preferably made of non-ferromagnetic material, preferably plastic, further preferably nylon. Silencer 22 will be further described below.

Rotor assembly 10 also includes shaft 21, on which pole pieces 12 and 14 are mounted for rotation therewith. Rotor assembly 10 is rotatably mounted inside the housing (not shown) and stator 23 of an alternator (a portion of stator 23 is shown in cross-section in FIG. 3).

Figure 4:
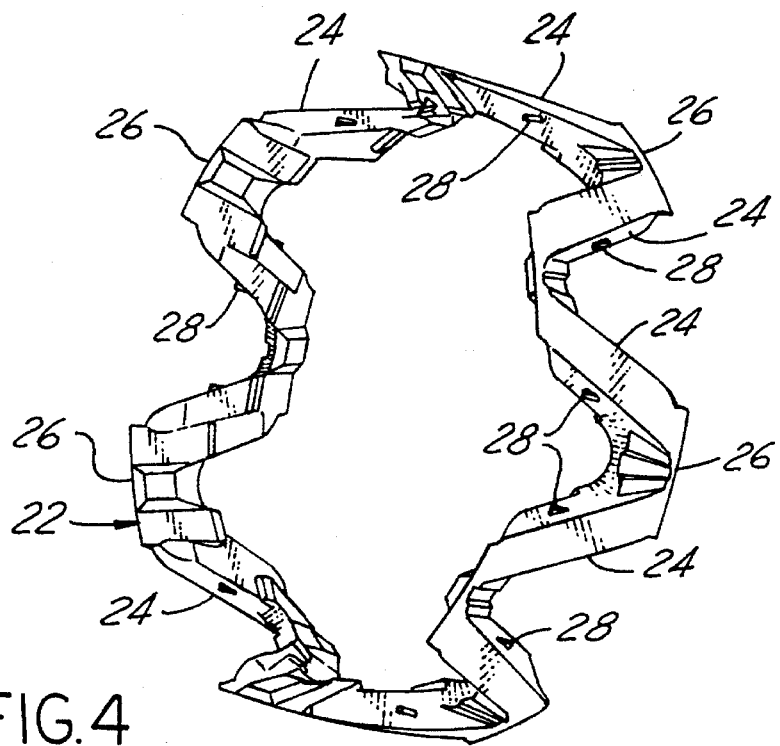
FIG. 4 is a perspective view of silencer 22 of rotor 10 of FIG. 1.

Referring now additionally to FIG. 4, silencer 22 will be described in more detail. Silencer 22 comprises silencing portions 24 adapted to fit in the gaps pole fingers 16 of pole pieces 12 and 14. Silencer 22 further comprises bridging portions 26 connecting silencing portions 24. These bridging portions are preferably designed to extend beneath the tips of fingers 16 of pole pieces 12 and 14. At least partially through contact between bridging portions 26 and the tips of pole fingers 16, silencer 22 is held in place in rotor assembly 10.

Extending from the sides of silencing portions 24 are projections 28. Projections 28 are designed to cooperate with lateral surfaces 17 of pole fingers 16 to restrain outward radial movement of silencing portions 24. Projections 28 can be located and sized such that they bear against lateral surfaces 17 of pole fingers 16 when rotor assembly 10 is not rotating (i.e., "at rest"). Alternatively, projections 28 can be sized and located such that there is contact with lateral surfaces 17 of pole fingers 16 only after some limited amount of outward radial movement of silencing portions 24 has occurred.

Projections 28 are preferably shorter in a direction along lateral surfaced 17 than the length of lateral surfaces 17. Further, projections 28 are preferably substantially shorter in that direction than the length of lateral surfaces 17. The preferred length of projections 28 in that direction is about three millimeters.

Preferably, there is contact between pole fingers 16 and silencer assembly 22 only at bridging portions 26 and (optionally, as described above) at projections 28. Such a situation provides two benefits. First, assembly of rotor assembly 10 is accomplished without undue effort, because of the relatively small contact area between silencer 22 and pole pieces 12 and 14. The pressing together of pole pieces 12 and 14 thus does not require much force. Second, after assembly of rotor assembly 10, varnish can be applied to the exterior of rotor assembly 10 and it will be able to flow around the sides of pole fingers 16 and to the interior of rotor assembly 10. Such application of varnish enhances the structural integrity of rotor assembly 10.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A rotor for an electrical machine, said rotor comprising:

first and second pole pieces together defining an axis of rotation, said pole pieces each having pole fingers extending generally parallel to said axis of rotation, said pole fingers having lateral surfaces, said pole fingers of said pole pieces intermeshed with one another, each pair of adjacent intermeshed pole fingers further defining a gap therebetween; and a silencer, said silencer comprising silencing portions at least partially filling said gaps, said silencer further comprising projections adapted to cooperate with said lateral surfaces of said pole fingers to limit radial movement of said silencing portions away from said axis of rotation of said rotor; wherein said silencing portions comprise lateral surfaces in opposition to said lateral surfaces of said pole fingers; and said projections extend from said lateral surfaces of said silencing portions.

2. A rotor as recited in claim 1, wherein said lateral surfaces of said pole fingers and said opposing lateral surfaces of said silencing portions define gaps therebetween.

3. A rotor as recited in claim 1, wherein:

said pole fingers are generally triangular, thereby each comprising a tip; and said silencer further comprises portions bridging said silencing portions, said bridging portions extending under said tips of said pole fingers.

4. A rotor as recited in claim 3, wherein said silencer is substantially constructed of non-ferromagnetic material.

5. A rotor as recited in claim 4, wherein said silencer and said pole fingers are in contact and wherein the only said contact between said silencer and said pole fingers is between said tips of said pole fingers and said bridging portions of said silencer, and between said projections and said lateral surfaces of said pole fingers.

6. A rotor as recited in claim 4, wherein said silencer and said pole fingers are in contact when said rotor is at rest and wherein the only said contact between said silencer and said pole fingers when said rotor is at rest is between said tips of said pole fingers and said bridging portions of said silencer.

7. A rotor as recited in claim 1, wherein said projections have a length in a direction along said lateral surfaces of said pole fingers less than the length of the lateral surfaces of said pole fingers.

8. A rotor as recited in claim 7, wherein said silencer is substantially constructed of non-ferromagnetic material.

9. A rotor as recited in claim 8, wherein said projections have a length in a direction along said lateral surfaces of said pole fingers substantially less than the length of the lateral surfaces of said pole fingers.

10. A rotor as recited in claim 9, wherein said projections have a length in a direction along said lateral surfaces of said pole fingers of approximately 3 millimeters.

11. A rotor as recited in claim 5, wherein said projections have a length in a direction along said lateral surfaces of said pole fingers less than the length of the lateral surfaces of said pole fingers.

12. A rotor as recited in claim 11, wherein said projections have a length in a direction along said lateral surfaces of said pole fingers substantially less than the length of the lateral surfaces of said pole fingers.

13. A rotor as recited in claim 12, wherein said projections have a length in a direction along said lateral surfaces of said pole fingers of approximately 3 millimeters.

14. An alternator comprising:

a stator;

a rotor rotatably mounted within and in opposition to said stator, said rotor further comprising first and second pole pieces together defining an axis of rotation, said pole pieces each having pole fingers extending generally parallel to said axis of rotation, said pole fingers having lateral surfaces, said pole fingers of said pole pieces intermeshed with one another, each pair of adjacent intermeshed pole fingers further defining a gap therebetween; and a silencer, said silencer comprising silencing portions at least partially filling said gaps, said silencer further comprising projections adapted to cooperate with said lateral surfaces of said pole fingers to limit outward movement of said silencing portions away from said axis of rotation of said rotor; wherein said silencing portions comprise lateral surfaces in opposition to said lateral surfaces of said pole fingers; and wherein said projections extend from said lateral surfaces of said silencing portions.

* * * * *